(12) United States Patent
Yamauchi

(10) Patent No.: US 6,246,724 B1
(45) Date of Patent: Jun. 12, 2001

(54) SIGNAL TRANSFER METHOD

(75) Inventor: Hiroyuki Yamauchi, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/533,982

(22) Filed: Mar. 23, 2000

(30) Foreign Application Priority Data

Mar. 25, 1999 (JP) .................................................. 11-082564

(51) Int. Cl.[7] ............................ H04L 25/34; H04L 25/49
(52) U.S. Cl. ............................................. 375/288; 375/257
(58) Field of Search .................................. 375/257, 286, 375/288; 326/99

(56) References Cited

U.S. PATENT DOCUMENTS

| | | | |
|---|---|---|---|
| 4,121,050 | * 10/1978 | Witt | 375/332 |
| 4,500,988 | * 2/1985 | Bennett et al. | 326/86 |
| 4,542,517 | * 9/1985 | Goss et al. | 375/257 |
| 4,556,864 | * 12/1985 | Roy | 340/310.06 |
| 4,777,331 | * 10/1988 | Borst | 178/120 |
| 5,504,737 | 4/1996 | Ichii et al. | 370/17 |
| 5,675,584 | 10/1997 | Jeong | 370/284 |
| 5,905,769 | 5/1999 | Lee et al. | 375/376 |

* cited by examiner

*Primary Examiner*—Chi Pham
*Assistant Examiner*—Phuong Phu
(74) *Attorney, Agent, or Firm*—Renner, Otto, Boisselle & Sklar, LLP

(57) ABSTRACT

A signal transfer method for transferring a multi-bit signal over a transfer path which is allocated to one bit includes the steps of: respectively assigning a plurality of parameters for a plurality of bits so that a value representing "0" or a value representing "1" is set to each of the plurality of parameters in accordance with a value of a corresponding one of the plurality of bits; outputting an electric signal to the transfer path, the electric signal expressing a combination of the plurality of parameters having the values as set in the assigning step; receiving the electric signal from the transfer path and extracting the plurality of parameters from the electric signal; and detecting the respective values of the plurality of parameters.

3 Claims, 4 Drawing Sheets

SIGNAL TRANSFER METHOD

BACKGROUND OF THE INVENTION

1. Field of the Invention

The present invention relates to a signal transfer method for transferring multi-bit signals over a transfer path which is allocated to one bit.

2. Description of the Related Art

Conventionally, two signal lines are employed for transferring signals having values of "0" or "1". At the transmission end of the transfer path, voltages which are selected in accordance with a particular value of a signal for transmission are applied to the two respective signal lines. At the receiving end of the transfer path, the difference between the voltage which is applied to one of the signal lines and the voltage which is applied to the other signal line is detected. For example, if the detected difference is larger than a predetermined voltage value, the received signal may be determined as having the value "1", and if the detected difference is smaller than the predetermined voltage value, the received signal may be determined as having the value "0". Such a pair of signal lines is usually referred to differential signal lines.

As a method for transferring a signal which may take one of three or more values (hereinafter such a signal will be referred to as a "multi-value" signal) over such a pair of differential signal lines, a method is known in which the range between a voltage corresponding to the "0" value and a voltage corresponding to the "1" value is divided into a plurality of regions, for example. According to this method, any values other than "0" or "1" can be assigned to the respective divided regions.

However, the aforementioned conventional method for transferring multi-value signals, which involves dividing a range between a voltage corresponding to the "0" value and the voltage corresponding to the "1" value into a plurality of regions, can only provide a small margin for the determination of signal values at the receiving end. This increases the likelihood of misdetecting signal values at the receiving end.

SUMMARY OF THE INVENTION

According to the present invention, there is provided a signal transfer method for transferring a multi-bit signal over a transfer path which is allocated to one bit, including the steps of: respectively assigning a plurality of parameters for a plurality of bits so that a value representing "0" or a value representing "1" is set to each of the plurality of parameters in accordance with a value of a corresponding one of the plurality of bits; outputting an electric signal to the transfer path, the electric signal expressing a combination of the plurality of parameters having the values as set in the assigning step; receiving the electric signal from the transfer path and extracting the plurality of parameters from the electric signal; and detecting the respective values of the plurality of parameters.

In one embodiment of the invention, the plurality of parameters include: a first parameter indicating a direction of an electric current flowing through the transfer path; a second parameter indicating an amount of electric current flowing through the transfer path; and a third parameter indicating a balance between an amount of electric current flowing out to the transfer path and an amount of electric current flowing in from the transfer path.

In another embodiment of the invention, the transfer path is a pair of differential signal lines.

According to the present invention, an electric signal which express a combination of a plurality of parameters, each parameter having a value representing "0" or "1", is output to a transfer path, and the electrical signal is received from the transfer path. The plurality of parameters are extracted from the received electric signal so that the values of the respective parameters can be detected.

Thus, at the transmission end, a multi-bit signal is encoded into an electric signal that can be transferred over a transfer path which is allocated to one bit. At the receiving end, the electric signal which has been received via the transfer path is decoded into a multi-bit signal. As a result, it is possible to transfer a signal having multiple values over a transfer path which is allocated to one bit.

Thus, the invention described herein makes possible the advantage of providing a signal transfer method for transferring multi-value signals over a transfer path which is allocated to one bit without increasing the likelihood of misdetecting signal values at the receiving end.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of examples, with reference to the accompanying figures.

Figure 1:
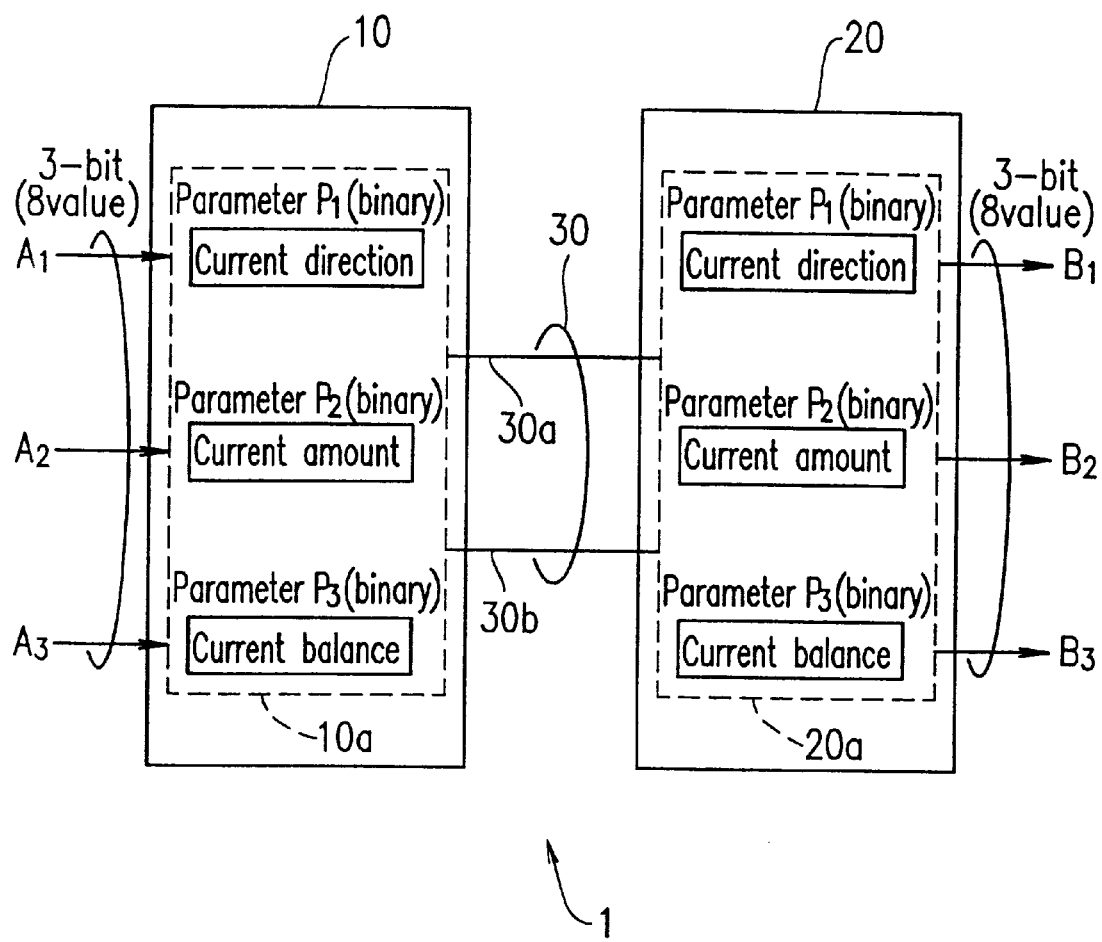
FIG. 1 is a schematic block diagram illustrating the structure of a signal transfer system 1 for implementing the signal transfer method according to the present invention.

FIG. 1 is a schematic block diagram illustrating the structure of a signal transfer system 1 for implementing the signal transfer method according to the present invention.

The signal transfer system 1 includes a transmitter 10, a receiver 20, and a transfer path 30 which connects the transmitter 10 to the receiver 20. The transfer path 30 is allocated to one bit.

In the example shown in FIG. 1, the transfer path 30 is illustrated as including signal lines 30a and 30b. The signal lines 30a and 30b may also be referred to as "differential signal lines".

The transmitter 10 receives a 3-bit signal ($A_1$, $A_2$, $A_3$). The 3-bit signal ($A_1$, $A_2$, $A_3$) can express eight (=2×2×2) different values.

The transmitter 10 includes an encoder section 10a for encoding the 3-bit signal ($A_1$, $A_2$, $A_3$) into an electric signal that can be transferred over the transfer path 30, which is allocated to one bit.

The bits $A_1$, $A_2$, $A_3$ are respectively assigned to parameters pertaining to different electrical characteristics. For example, the bit $A_1$ may be assigned to a parameter $P_1$ which represents the direction of an electric current flowing through the transfer path 30 (hereinafter simply referred to as a "current direction"): the bit $A_2$ may be assigned to a parameter $P_2$ which represents the amount of electric current flowing out to the transfer path 30 (hereinafter simply referred to as a "current amount"); and the bit $A_3$ may be assigned to a parameter $P_3$ which represents the balance between the amount of electric current flowing out to the transfer path 30 and the amount of electric current flowing in from the transfer path 30 (hereinafter simply referred to as a "current balance").

Each of the parameters $P_1$, $P_2$, $P_3$ takes a value representing "0" or "1".

The relationship between the values of the parameter $P_1$ and the current direction may be defined as shown in Table 1 below:

TABLE 1

| value of parameter $P_1$ | current direction |
|---|---|
| "0" |  (signal line 30a → decoder section 20a → signal line 30b) |
| "1" |  (signal line 30b → decoder section 20a → signal line 30a) |

In other words, when a current flows in the transfer path 30 in the clockwise direction (i.e., in the order of the signal line 30a→the decoder section 20a→the signal line 30b), the parameter $P_1$ takes the "0" value. When a current flows in the transfer path 30 in the counterclockwise direction (i.e., in the order of the signal line 30b→the decoder section 20a→the signal line 30a), the parameter $P_1$ takes the "1" value.

The relationship between the values of the parameter $P_2$ and the current amount may be defined as shown in Table 2 below:

TABLE 2

| value of parameter $P_2$ | current amount |
|---|---|
| "0" | small (e.g., 5 mA) |
| "1" | large (e.g., 5.25 mA) |

In other words, when the amount of current which flows out to the transfer path 30 is relatively small (e.g., 5 mA), the parameter $P_2$ takes the "0" value. When the amount of current which flows out to the transfer path 30 is relatively large (e.g., 5.25 mA), the parameter $P_2$ takes the "1" value.

The relationship between the values of the parameter $P_3$ and the current balance may be defined as shown in Table 3 below:

TABLE 3

| value of parameter $P_3$ | current balance |
|---|---|
| "0" | amount of current flowing out = amount of current flowing in |
| "1" | amount of current flowing out ≠ amount of current flowing in |

In other words, when the amount of current flowing out to the transfer path 30 is equal to the amount of current flowing in from the transfer path 30, the parameter $P_3$ takes the "0" value. When the amount of current flowing out to the transfer path 30 is not equal to the amount of current flowing in from the transfer path 30, the parameter $P_3$ takes the "I" value.

The encoder section 10a sets the values of the parameter $P_1$ to $P_3$ in accordance with the values of the bits $A_1, A_2, A_3$, and outputs an electric signal which expresses a combination of the parameters $P_1$, $P_2$, $P_3$ to the transfer path 30.

For example, if $(A_1, A_2, A_3)=(0, 1, 1)$, the encoder section 10a sets the values of parameters $P_1$, $P_2$, and $P_3$ such that $(P_1, P_2, P_3)=(0, 1, 1)$, and outputs an electric signal which expresses this combination of parameters $P_1$, $P_2$, $P_3$ to the transfer path 30. In this case, the electric signal which is output to the transfer path 30 is an electric signal which flows in the clockwise current direction ($P_1$="0"), and which has a large current amount ($P_2$="1"), such th at the amount of current flowing out to the transfer path 30 is not equal to the amount of current flowing in from the transfer path 30 ($P_3$="1").

Thus, the encoder section 10a encodes the 3-bit signal $(A_1, A_2, A_3)$ into an electric signal that can be transferred over the transfer path 30, which is allocated to one bit. The resultant electric signal is output to the transfer path 30.

Figure 2:
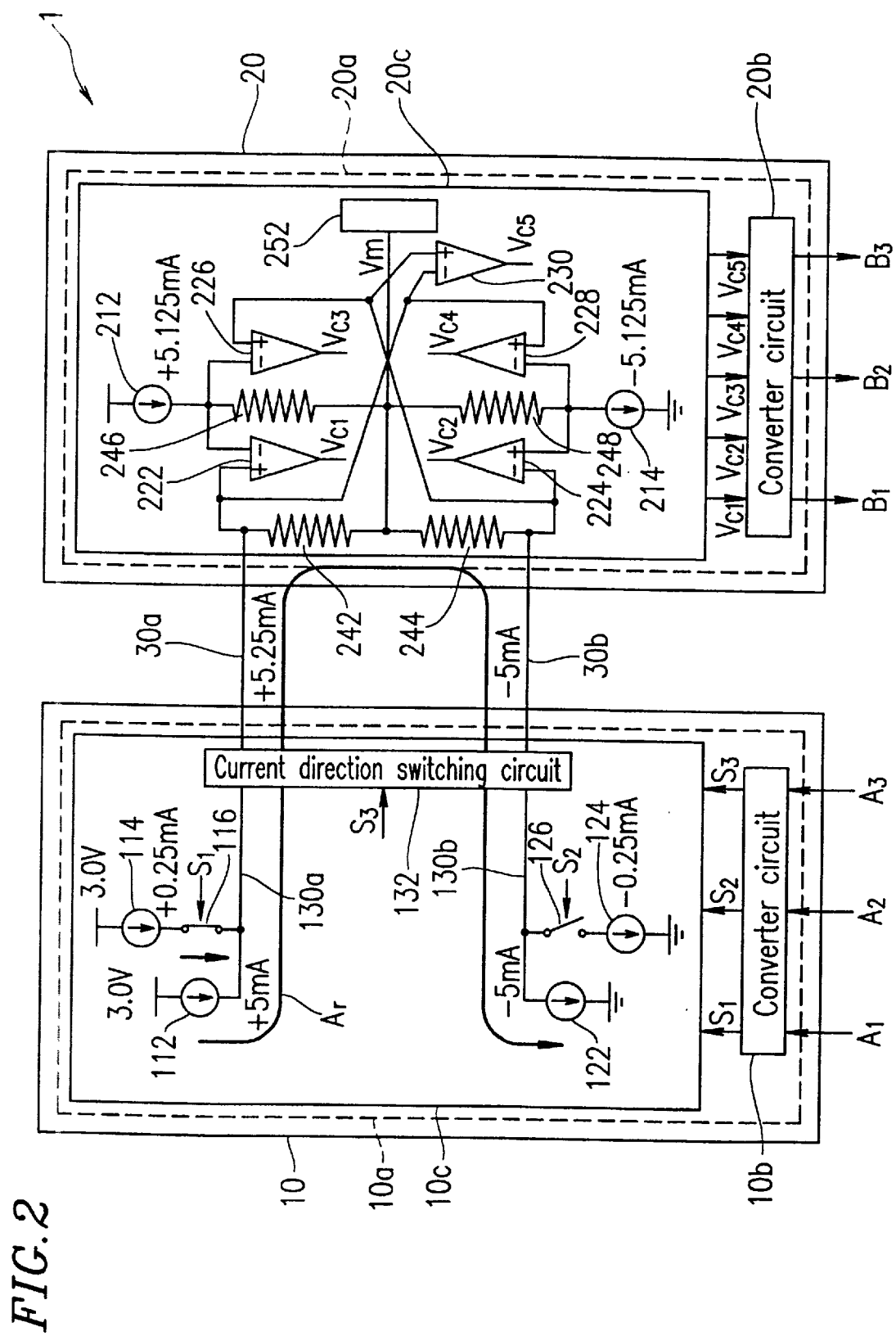
FIG. 2 is a more detailed block diagram illustrating the structure of the signal transfer system 1.

The receiver 20 includes a decoder section 20a for receiving the electric signal from the transfer path 30 and decoding the electric signal into a 3-bit signal $(B_1, B_2, B_3)$. Such decoding is achieved by extracting the parameters $P_1$, $P_2$, and $P_3$ from the electric signal and detecting the respective values of the parameters $P_1$, $P_2$, and $P_3$. FIG. 2 is a more detailed block diagram illustrating the structure of the signal transfer system 1.

In the transmitter 10, the encoder section 20a includes a converter circuit 10b for converting the 3-bit signal $(A_1, A_2, A_3)$ into a set of control signals $(S_1, S_2, S_3)$, and an electric signal output circuit 10c for generating an electric signal in accordance with the set of control signals $(S_1, S_2, S_3)$ and outputting the generated electric signal to the transfer path 30.

The electric signal output circuit 10c includes a constant current source 112 (+5 mA) and a constant current source 114 (+0.25 mA). One end of the constant current source 112 is coupled to a source potential, and the other end of the constant current source 112 is coupled to the signal line 130a. One end of the constant current source 114 is coupled to the source potential, and the other end of the constant current source 114 is coupled to the signal line 130a via a switch 116. The signal line 130a is coupled to a current direction switching circuit 132. The source potential may be about 3.0 V, for example.

The switch 116 is turned on and off in accordance with the control signal $S_1$, which is output from the converter circuit 10b. If the control signal $S_1$ has the "1" value, the switch 116 is turned on. If the control signal $S_1$ has the "0" value, the switch 116 is turned off.

The electric signal output circuit 10c further includes a constant current source 122 (−5 mA) and a constant current source 124 (−0.25 mA). One end of the constant current source 122 is coupled to a ground potential, and the other end of the constant current source 122 is coupled to the signal line 130b. One end of the constant current source 124 is coupled to the ground potential, and the other end of the constant current source 124 is coupled to the signal line 130b via a switch 126. The signal line 130b is coupled to the current direction switching circuit 132. The ground potential may be about 0 V, for example.

The switch 126 is turned on and off in accordance with the control signal $S_2$, which is output from the converter circuit 10b. If the control signal $S_2$ has the "1" value, the switch 126 is turned on. If the control signal $S_2$ has the "0" value, the switch 126 is turned off.

The current direction switching circuit 132 in the electric signal output circuit loa switches the direction of the current which flows through the transfer path 30 (i.e., the signal lines 30a and 30b) in accordance with the control signal $S_3$ which is output from the converter circuit 10b.

When the signal $S_3$ takes the "0" value, the current direction switching circuit 132 electrically couples the signal line 130a to the signal line 30a, and couples the signal line 130b to the signal line 30b. As a result, the current which flows out from the constant current sources 112 and 114 flows in the clockwise direction (i.e., in the order of the signal line 130a→the signal line 30a→the receiver 20→the signal line 30b→the signal line 130b).

When the signal $S_3$ takes the "1" value, the current direction switching circuit 132 electrically couples the signal line 130a to the signal line 30b, and couples the signal line 130b to the signal line 30a. As a result, the current which flows out from the constant current sources 112 and 114 flow in the counterclockwise direction (i.e., in the order of the signal line 130a→the signal line 30b→the receiver 20→the signal line 30a→the signal line 130b).

Table 4 illustrates the logical operations performed by the converter circuit 10b.

TABLE 4

| $A_1$ | $A_2$ | $A_3$ | $S_1$ | $S_2$ | $S_3$ |
|---|---|---|---|---|---|
| 0 | 0 | 0 | 0 | 0 | 0 |
| 0 | 0 | 1 | 0 | 1 | 0 |
| 0 | 1 | 0 | 1 | 1 | 0 |
| 0 | 1 | 1 | 1 | 0 | 0 |
| 1 | 0 | 0 | 0 | 0 | 1 |
| 1 | 0 | 1 | 0 | 1 | 1 |
| 1 | 1 | 0 | 1 | 1 | 1 |
| 1 | 1 | 1 | 1 | 0 | 1 |

The logical operations illustrated in Table 4 can be realized based on the logical formulae shown in eq. 1.

The converter circuit 10b can be implemented by any logic circuit which satisfies the logical formula expressed by eq. 1:

$$S_1 = A_2$$
$$S_2 = A_3 \text{ (if } A_2 = \text{"0"})$$
$$= /A_3 \text{ (if } A_2 = \text{"1"})$$
$$S_3 = A_1 \quad \text{eq. 1}$$

In eq. 1, $/A_3$ means a logical NOT of $A_3$.

Arrow $A_r$ shown in FIG. 2 shows the flow of an electric signal which results from encoding the 3-bit signal $(A_1, A_2, A_3)=(0, 1, 1)$.

According to Table 4, the 3-bit signal $(A_1, A_2, A_3)=(0, 1, 1)$ is converted into a set of control signals $(S_1, S_2, S_3)=(1, 0, 0)$ by the converter circuit 10b. As a result, the control signal $S_1$ turns on the switch 116, and the control signal $S_2$ turns off the switch 126. The control signal $S_3$ controls the current direction switching circuit 132 so that an electric current will flow through the transfer path 30 in the clockwise direction. As a result, the current from the constant current sources 112 and 114 (+5.25 mA) flows through the signal line 30a from the transmitter 10 to the receiver 20. Moreover, a current (−5 mA) flows through the signal line 30b from the receiver 20 to the transmitter 10, so as to be drawn into the constant current source 122. The difference (+0.25 mA) between the current flowing through the signal line 30a (+5.25 mA) and the current flowing through the signal line 30b (−5 mA) is compensated for by a common current compensation circuit 252 in the receiver 20.

Thus, by encoding the 3-bit signal $(A_1, A_2, A_3)=(0, 1, 1)$ in the above-described manner, an electric signal is output to the transfer path 30 which flows therethrough in the clockwise current direction ($P_1$="0"), and which has a large current amount (5.25 mA) flowing out thereto ($P_2$="1"), such that the amount of current (5.25 mA) flowing out to the transfer path 30 is not equal to the amount of current (5 mA) flowing in from the transfer path 30 ($P_3$="1"). This electric signal is an electric signal which expresses a combination of parameters such that $(P_1, P_2, P3)=(0, 1, 1)$.

Figure 3A:
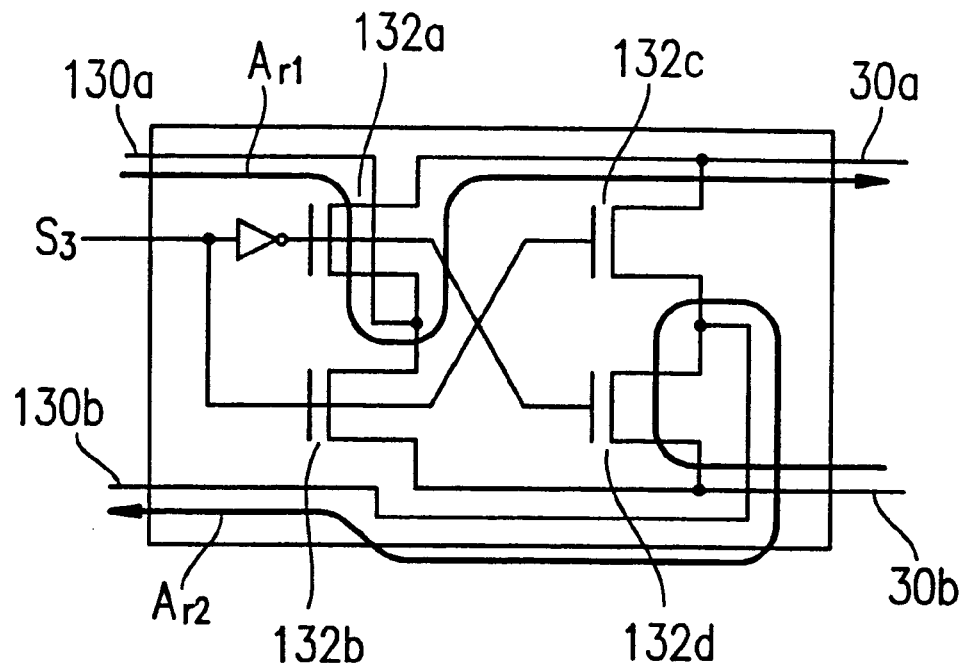
FIGS. 3A and 3B are circuit diagrams illustrating an example structure of a current direction switching circuit 132 according to the present invention.
Figure 3B:
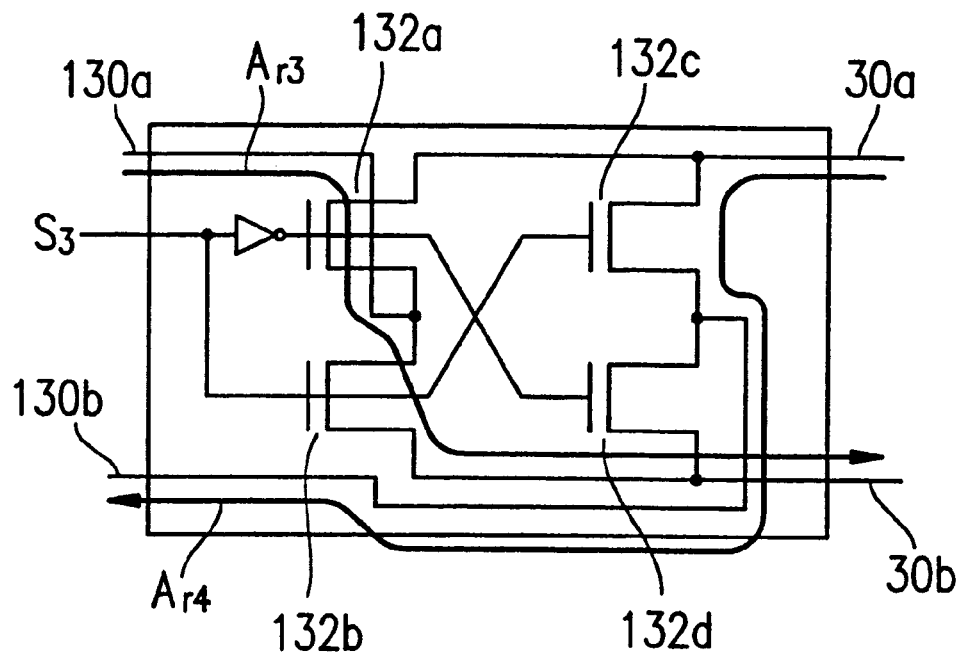

FIGS. 3A and 3B are circuit diagrams illustrating an example structure of the current direction switching circuit 132. The current direction switching circuit 132 includes transistors 132a to 132d.

In FIG. 3A, arrows $A_{r1}$ and $A_{r2}$ show the current path in the case where the control signal $S_3$ takes the "0" value. When the control signal $S_3$ takes the "0" value, the transistors 132a and 132d are turned on. As a result, the signal lines 130a and 30a are electrically interconnected, and the signal lines 130b and 30b are electrically interconnected.

In FIG. 3B, arrows $A_{r3}$ and $A_{r4}$ show the current path in the case where the control signal $S_3$ takes the "1" value. When the control signal $S_3$ takes the "1" value, the transistors 132b and 132a are turned on. As a result, the signal lines 130a and 30b are electrically interconnected, and the signal lines 130b and 30a are electrically interconnected.

With reference to FIG. 2, the decoding section 20a in the receiver 20 includes an electric signal input circuit 20c for receiving an electric signal from the transfer path 30 and generating output voltages $V_{c1}$ to $V_{c5}$ in accordance with the received electric signal, and a converter circuit 20b for converting the set of output voltages $(V_{c1}, V_{c2}, V_{c3}, V_{c4}, V_{c5})$ into a 3-bit signal $(B_1, B_2, B_3)$.

The electric signal input circuit 20a includes a constant current source 212 (+5.125 mA), a constant current source 214 (−5.125 mA), comparators 222, 224, 226, 228, and 230, resistors 242, 244, 246, and 248, as well as a common current compensation circuit 252.

One end of the constant current source 212 is coupled to a source potential, and the other end of the constant current source 212 is coupled to the common current compensation circuit 252 via the resistor 246. One end of the constant current source 214 is coupled to a ground potential, and the other end of the constant current source 214 is coupled to the common current compensation circuit 252 via the resistor 248. The source potential may be about 3.0 V, for example. The ground potential may be about 0 V, for example.

One end of the resistor 242 is coupled to the signal line 30a, and the other end of the resistor 242 is coupled to the resistor 244 and the common current compensation circuit 252. One end of the resistor 244 is coupled to the signal line 30b, and the other end of the resistor 244 is coupled to resistor 242 and the common current compensation circuit 252. The resistors 242 and 244 may each have a resistance of about 50Q, for example.

Each of the comparators 222, 224, 226, 228, and 230 has a + input terminal and a − input terminal. If the voltage which is input at the + input terminal is lower than the voltage input at the − input terminal, each comparator outputs a signal representing the "0" value. If the voltage which is input at the + input terminal is higher than the voltage input at the − input terminal, each comparator outputs a signal representing the "1" value.

The comparator 230 is used for detecting the value of the parameter $P_1$ (current direction). The comparator 230 outputs the output voltage $V_{c5}$.

The comparators 222 and 224 are used for detecting the value of the parameter $P_2$ (current amount) and the parameter $P_3$ (current balance) in the case where an electric current is flowing through the transfer path 30 in the clockwise direction. The comparator 222 outputs the output voltage $V_{c1}$, and the comparator 224 outputs the output voltage $V_{c2}$.

The comparators 226 and 228 are used for detecting the value of the parameter $P_2$ (current amount) and the parameter $P_3$ (current balance) in the case where an electric current is flowing through the transfer path 30 in the counterclockwise direction. The comparator 226 outputs the output voltage $V_{c3}$, and the comparator 228 outputs the output voltage $V_{c4}$.

The common current compensation circuit 252 compensates for the difference between the current flowing through the signal line 30a and the current flowing through the signal line 30b.

For example, in the case where an electric current of +5.25 mA is flowing through the signal line 30a from the transmitter 10 to the receiver 20 and an electric current of −5 mA is flowing through the signal line 30b from the receiver 20 to the transmitter 10, an electric current of +0.25 mA is drawn into the common current compensation circuit 252. For another example, in the case where an electric current of +5 mA is flowing through the signal line 30a from the transmitter 10 to the receiver 20 and an electric current of −5.25 mA is flowing through the signal line 30b from the receiver 20 to the transmitter 10, an electric current of −0.25 mA is discharged from the common current compensation circuit 252.

Figure 4A:
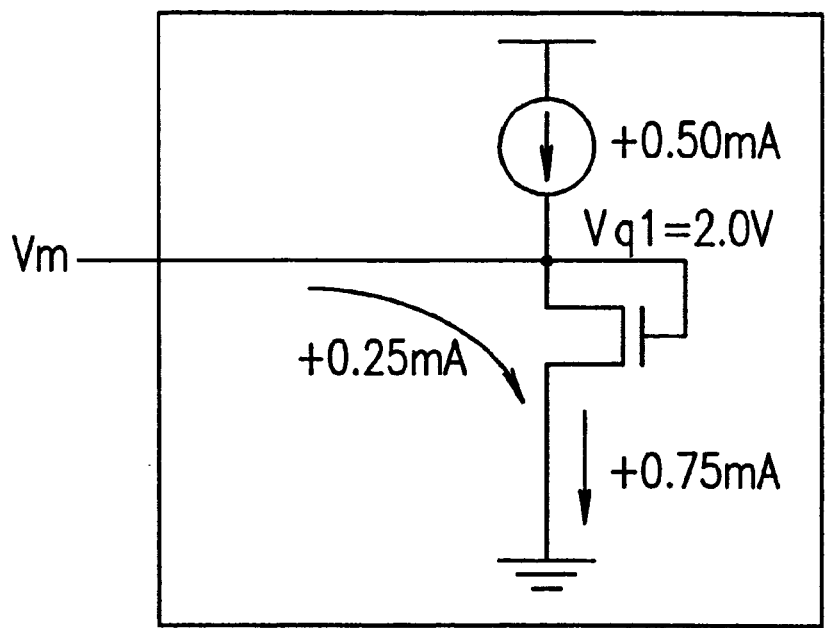
FIGS. 4A and 4B are circuit diagrams illustrating an example structure of a common current compensation circuit 252 according to the present invention.
Figure 4B:
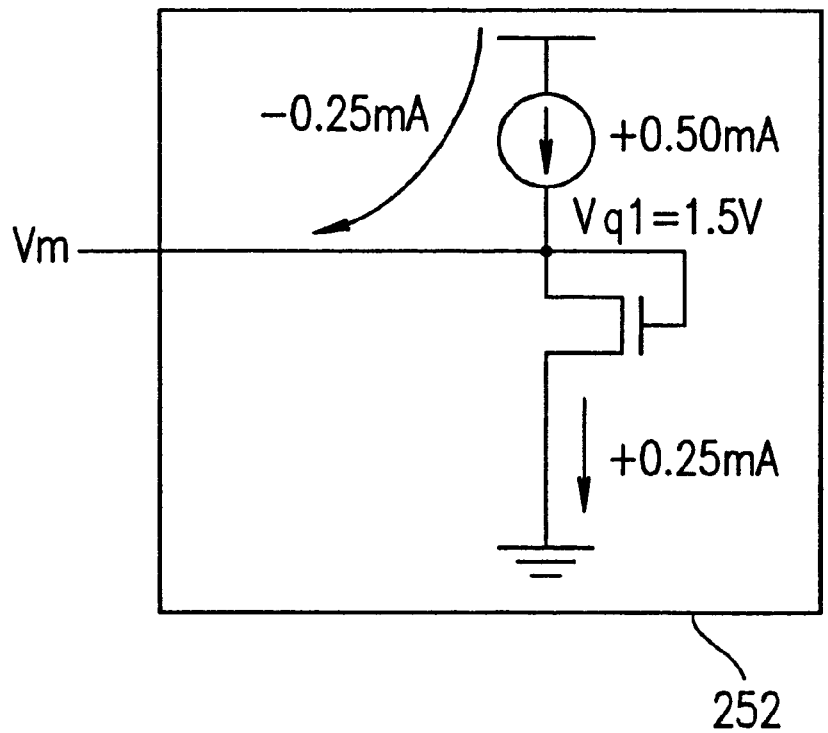

FIGS. 4A and 4B are circuit diagrams illustrating an example structure of the common current compensation circuit 252. FIG. 4A illustrates an electric current of +0.25 mA being drawn into the common current compensation circuit 252. FIG. 4B illustrates an electric current of −0.25 mA being discharged from the common current compensation circuit 252.

Table 5 illustrates the logical operations performed by the converter circuit 20b.

TABLE 5

| $V_{c1}$ | $V_{c2}$ | $V_{c3}$ | $V_{c4}$ | $V_{c5}$ | $B_1$ | $B_2$ | $B_3$ |
|---|---|---|---|---|---|---|---|
| 0 | 0 | — | — | 0 | 0 | 0 | 0 |
| 0 | 1 | — | — | 0 | 0 | 0 | 1 |
| 1 | 1 | — | — | 0 | 0 | 1 | 0 |
| 1 | 0 | — | — | 0 | 0 | 1 | 1 |
| — | — | 0 | 0 | 1 | 1 | 0 | 0 |
| — | — | 0 | 1 | 1 | 1 | 0 | 1 |
| — | — | 1 | 1 | 1 | 1 | 1 | 0 |
| — | — | 1 | 0 | 1 | 1 | 1 | 1 |

The logical operations illustrated in Table 5 can be realized based on the logical formulae shown in eq. 2. The converter circuit 20b can be implemented by any logic circuit which satisfies the logical formula expressed by eq. 2:

$B_1 = V_{c5}$ $B_2 = V_{c1}$ (if $V_{c5}$="0")

$= V_{c3}$ (if $V_{c5}$="1")

$B_3 = V_{c2}$ (if $V_{c5}$="0" and if $V_{c1}$=0)

$= /V_{c2}$ (if $V_{c5}$="0" and if $V_{c1}$="1")

$= V_{c4}$ (if $V_{c5}$="1" and if $V_{b3}$="0")

$= /V_{c4}$ (if $V_{c5}$="1" and if $V_{c3}$="1") eq. 2

In eq. 2, $/V_{c2}$ means a logical NOT of $V_{c2}$, and $/V_{c4}$ means a logical NOT of $V_{c4}$.

Thus, the decoder section 20a receives an electric signal from the transfer path 30 and decodes the received electric signal to generate a 3-bit signal ($B_1$, $B_2$, $B_3$).

For example, an electric signal expressing a combination of parameters ($P_1$, $P_2$, $P_3$)=(0, 1, 1) is decoded into a 3-bit signal ($B_1$, $B_2$, $B_3$)=(0, 1, 1). The 3-bit signal ($B_1$, $B_2$, $B_3$) is identical with the 3-bit signal ($A_1$, $A_2$, $A_3$).

Thus, a 3-bit signal can be successfully transferred from the transmitter 10 to the receiver 20 via the transfer path 30, which is allocated to one bit.

Although a transfer of a 3-bit signal is illustrated in the above example, the present invention is not limited to such embodiments. An N-bit signal can be transferred by transferring an electric signal which expresses a combination of N parameters via a transfer path which is allocated to one bit, where N is an integer equal to or greater than 2.

Any configuration of the transfer path 30 can be selected so long as the transfer path 30 is allocated to one bit. For example, the transfer path 30 may be composed of one signal line.

In the above example, the parameter $P_2$ is illustrated as indicating the amount of current which flows out to the transfer path 30. Alternatively, the parameter $P_2$ may indicate the amount of current which flows in from the transfer path 30.

According to the present invention, an electric signal which express a combination of a plurality of parameters, each parameter having a value representing "0" or "1", is output to a transfer path, from which the electrical signal is received. The plurality of parameters are extracted from the received electric signal so that the values of the respective parameters are detected. As a result, it is possible to transfer a multi-bit signal over a transfer path which is allocated to one bit.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A signal transfer method for transferring a multi-bit signal over a transfer path which is allocated to one bit, comprising the steps of:

respectively assigning a plurality of parameters for a plurality of bits so that a value representing "0" or a value representing "1" is set to each of the plurality of parameters in accordance with a value of a corresponding one of the plurality of bits;

outputting an electric signal to the transfer path, the electric signal expressing a combination of the plurality of parameters having the values as set in the assigning step;

receiving the electric signal from the transfer path and extracting the plurality of parameters from the electric signal; and detecting the respective values of the plurality of parameters.

2. A signal transfer method according to claim 1, wherein the plurality of parameters comprise: a first parameter indicating a direction of an electric current flowing through the transfer path; a second parameter indicating an amount of electric current flowing through the transfer path; and a third parameter indicating a balance between an amount of electric current flowing out to the transfer path and an amount of electric current flowing in from the transfer path.

3. A signal transfer method according to claim 1, wherein the transfer path is a pair of differential signal lines.

* * * * *